July 11, 1933.  A. M. VEDOE  1,917,345
OVEN REGULATOR
Filed May 19, 1931
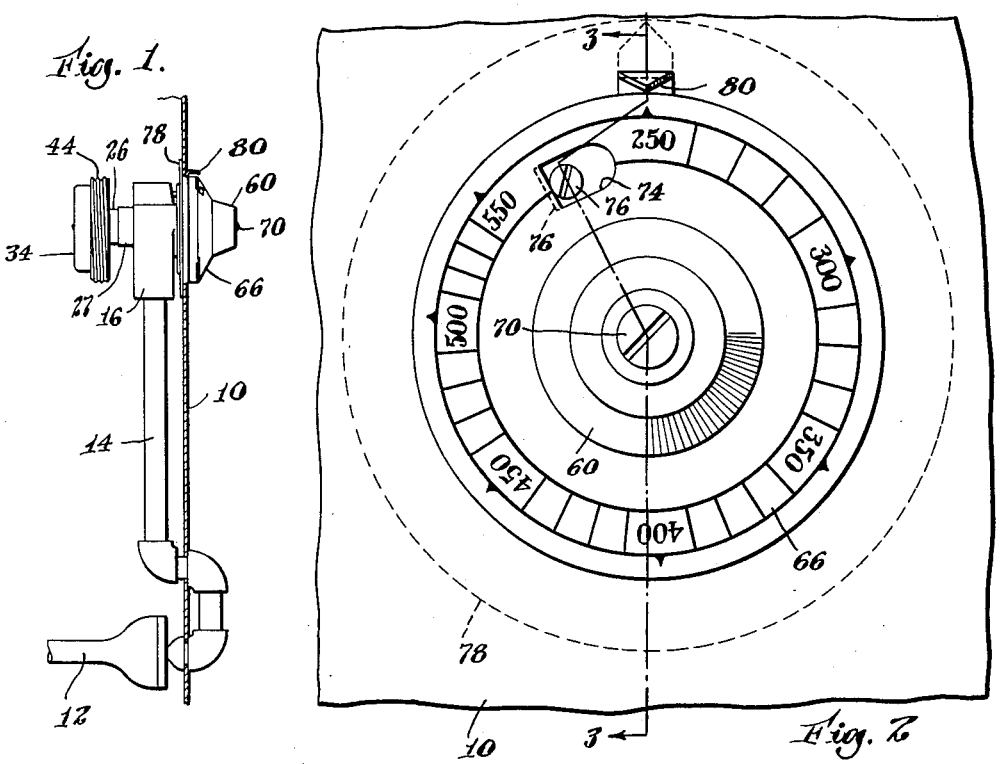
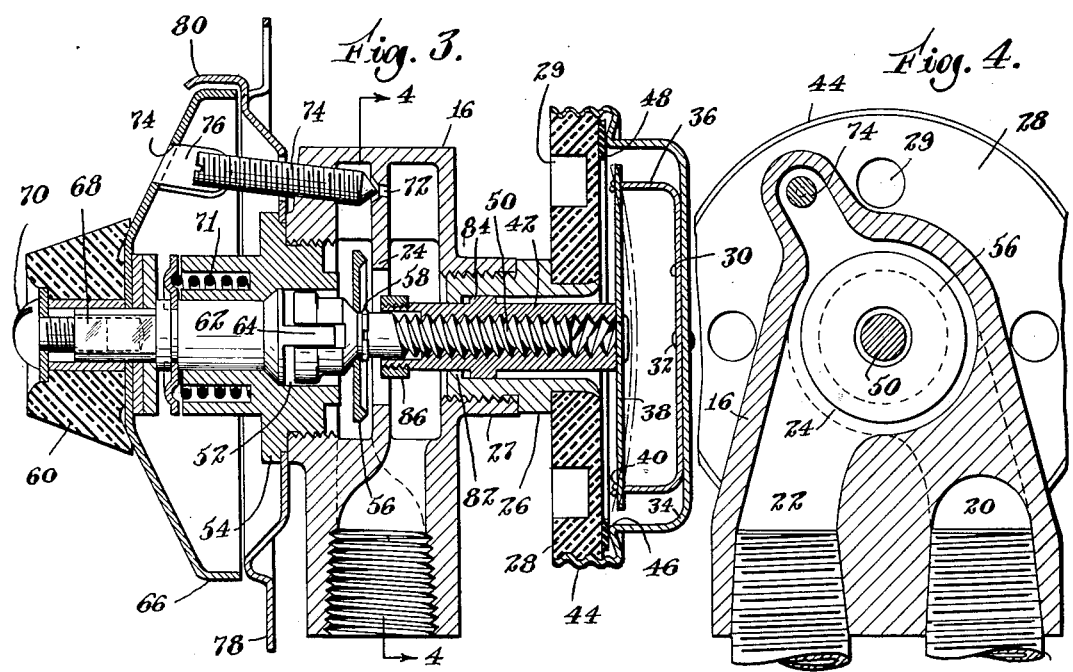
Inventor
Anton M. Vedoe
by
Attorneys Patented July 11, 1933

1,917,345

UNITED STATES PATENT OFFICE

ANTON M. VEDOE, OF WOLLASTON, MASSACHUSETTS, ASSIGNOR TO VEDOE-PETERSON CO., OF NORFOLK DOWNS, MASSACHUSETTS, A PARTNERSHIP CONSISTING OF ANTON M. VEDOE AND ERICK J. PETERSON

OVEN REGULATOR

Application filed May 19, 1931. Serial No. 538,408.

This invention relates to thermostatic regulators and more especially to such regulators which are particularly adapted to control automatically the temperature of baking ovens and the like by controlling the flow of gaseous fuel thereto. The invention is more in the nature of an improvement on a regulator disclosed in a copending application, Serial No. 502,957, to myself and Carl Eibye, and one of the objects thereof is to provide a more compact and simplified construction.

I have found that it is desirable to mount as much as possible of the regulator inside of the oven and, in accordance with my improvement herein, the entire regulator, with the exception of the operating knob and indicating dial, is adapted to be so mounted within the oven. The main part of the regulator comprises a relatively heavy and metallic body member for conducting the gas and in the compact regulator of my improved type this member is so closely adjacent to the thermostatic controlling member as to somewhat affect the action thereof. Another object of my invention, therefore, is to provide a heat-insulating wall so located between these members as to eliminate this objection.

Other objects of the invention are to provide a protective housing for the thermostatic plate and a convenient assembly between the housing and said wall and including a substantially air-tight joint at their junction; means positively limiting movement of the valve and thermostatic plate beyond safe limits; and means providing a more convenient and cheaper bypass adjustment and stop for the manual adjustment of the valve.

In the accompanying drawing I have shown one specific embodiment of my invention but it will be understood that the invention can be otherwise embodied and that the drawing is not to be construed as defining or limiting the scope of the invention, the claims appended hereto being relied upon for that purpose.

Referring to the figures of the drawing,

Fig. 1 is a side elevation of my improved regulator mounted in an oven;

Fig. 2 is an enlarged front view thereof;

Fig. 3 is a vertical sectional view through the regulator on line 3—3 of Fig. 2; and Fig. 4 is a vertical cross sectional view taken on line 4—4 of Fig. 3.

I have for convenience and simplicity in the accompanying drawing and throughout the specification illustrated and described my invention in connection with baking ovens. Such an oven 10 is heated by a gas burner 12 to which fuel, ordinarily a gas, is supplied by a pipe 14. In accordance with my invention the flow of this gas is automatically controlled by a regulator 16 and through which gas passes to the pipe 14 from a main supply pipe.

The body 16 of the regulator has gas inlet and outlet ports 20 and 22 and a valve seat 24 at the junction of these ports. Threaded openings are provided in the front and rear walls of the member 16, and means extending through these openings are respectively adapted manually to adjust the fuel-controlling valve and to control automatically the same in accordance with the oven temperature. A bushing 26 is threaded into a boss 27 around the rear wall opening and mounted on the outer end of this bushing is a disk 28 of asbestos or the like providing a heat-insulating wall between the body member 16 and the thermostatic element of the regulator, the disk being provided with wrench-engaging openings 29 for tightening the same into assembled position.

The thermostat of my improved regulator comprises a compound plate 30, the inner portion of which has a less coefficient of expansion than does the outer portion, whereby it is adapted to perform the valve-operating function hereinafter described. This plate as illustrated is of rectangular shape, is secured at its central portion 32 to the inner face of a cup-like member 34, and has its outer end portions 36 bent away from the member 34. These two ends are connected by any convenient and suitable means, as the thin flexible plate 38 illustrated as receiving riveting portions 40 of the ends 36 therethrough. Secured to the central portion of the plate 38 and extending into the bushing 26 is an internally-threaded stud 42. This stud and plates 38 and 30 are assembled together and onto the member 34 and this member is thereafter threaded onto the peripheral edge of the disk 28 at 44. The intermediate portion of the member 34 is bent inwardly to provide an annular shoulder 46 which is adapted to engage resiliently against a gasket 48 and thereby provide a substantially gastight joint between the disk and member.

A valve stem 50 has one end portion threaded into the stud 42 and its other end is rotatably supported in the inner end of a bore 52 through a bushing 54 threaded into the opening in the front wall of the body 16. The valve which cooperates with the valve seat 24 comprises a disk 56 loosely mounted on the valve stem between a shoulder thereon and a spring ring 58. The valve is thereby so floatingly supported that it automatically seats into accurate engagement with the valve seat. The valve may be manually moved, as hereinafter described, by rotating the valve stem 50 and the valve is automatically moved in both directions by longitudinal movement of the valve stem under the influence of the thermostatic plate 30. The threads on the stem 50 are of such coarse pitch that one complete turn of the valve stem will move the valve through its full range.

The valve stem may be manually rotated and thereby move the valve toward or from its seat by means of an adjusting knob 60 on the outer end of a stem 62 within the bore 52. This stem has a tongue and groove connection 64 with the valve stem whereby to permit manual rotation of the valve stem by means of the knob 60 without interfering with longitudinal movement of the valve stem under the action of the thermostat 30. This manual adjustment is indicated by a dial 66 supported on the reduced outer portion 68 of the stem 62, the knob and dial being prevented from relative rotation on the stem by engaging a flat on the portion 68. A screw 70 holds these parts assembled and a spring 71 acts to hold the stem 62 in its full retracted position.

A bypass is provided around the valve by means of an opening 72. A screw 74 threaded into the body 16 has a conical end cooperating with the opening 72 to adjust the flow of gas therethrough. This screw extends outwardly into the dial 66 and may be adjusted by extending a screw driver through a hole 74 in the dial. This hole is formed by cutting a tab 76 from the dial and bending it inwardly, the tab thereupon also acting as a stop for the dial by engaging against the screw.

The device is mounted in an oven, as shown in Fig. 1, the oven wall 10 being located inwardly of the dial 66 and outwardly of a plate 78 carried by the bushing 54, a tab 80 cut and bent from the plate serving as an index for the dial. The dial 66 engages against the outer face of the oven wall 10 and is opposed by an annular rib struck up from the plate 78 and engaging against the inner face of the wall (Fig. 3). It will, therefore, be seen that the entire regulator except the knob 60 and dial 66 is located within the oven. The body 16 being relatively heavy and of metal would adversely affect the action of the thermostat 30 when heating up or cooling off the oven but the disk 28 provides a heat-insulating wall which eliminates this difficulty.

The operation of the device is substantially as follows. In Fig. 2 the valve is fully closed and the oven is underheated, the screw 74 being adjusted to permit the passage of just sufficient gas for the pilot light. When a baking operation is to be performed, the valve is opened by means of the knob 60 and the oven burner lighted in the usual manner. The knob is thereafter rotated to register, in alignment with the pointer 80, the dial reading corresponding to the desired oven temperature, the thermostat thereupon being adapted to control automatically the valve to keep the oven at that temperature.

The member 34 is of such relatively thin metal that the oven heat readily passes therethrough to the thermostat plate 30. As the oven becomes heated, the plate 30 curves toward the valve in a manner moving the ends 36 toward each other. This action, as indicated in broken lines in Fig. 3, bends the connecting plate 38 outwardly and moves the valve stem in a manner bringing its valve 56 toward the valve seat, thereby automatically cutting down the supply of gas passing to the burner. Obviously the degree of plate curvature and, therefore, the amount of valve movement is proportional to the oven temperature.

It is obvious that extreme temperatures might possibly move the plate 30 to a position in one direction or the other as to cause damage. For the purpose of eliminating such possibility, I have provided an annular shoulder 82 on the bushing 26 and a cooperating shoulder 84 and ring 86 on the stud 42. These shoulders will limit bending movement of the plate 30 in both directions and they are so located as to permit just the maximum amount of movement necessary to perform the gas-regulating functions.

Having thus described my invention, what I claim as new and desire to secure by Letters Patent is:

1. An oven regulator comprising a body member having two connected gas ports extending thereinto, a valve intercepting said ports, a thermostatic plate extending transversely of the valve axis and spaced from and connected to the valve, means carried by the body member and providing a heat-insulating wall between the body member and plate, and a cup-like member mounted on said wall and housing and supporting the plate therein on its bottom wall.

2. An oven regulator comprising a body member having two connected gas ports extending thereinto, a valve intercepting said ports, a thermostatic plate spaced from and connected to the valve, means carried by the body member and providing a heat-insulating wall between the body member and plate, a metallic cup screw-threaded to the peripheral edge of the said wall and having the plate secured to the inner face of its bottom wall, and means providing a gas-tight joint between the cup and wall.

3. An oven regulator comprising a body member having two connected gas ports extending thereinto, a valve intercepting said ports, a bushing carried by the body member, a thermostatic plate spaced from the end of the bushing, means extending through the bushing and connecting the valve and plate, and means including two relatively spaced stop shoulders on the first-named means cooperating with other stop shoulders positively limiting movement of the first-named means in the valve-opening and closing directions.

4. An oven regulator comprising a body member having two connected gas ports extending thereinto, a valve intercepting said ports, a bushing carried by the body member, a thermostatic plate spaced from the end of the bushing, means extending through the bushing and connecting the valve and plate, and coacting shoulders on the bushing and first-named means positively limiting movement of the first-named means in the valve-opening and closing directions.

5. An oven regulator comprising a body member having two connected gas ports extending thereinto, a valve intercepting said ports, a thermostatic plate spaced from and connected to the valve, a screw threaded into the body member and cooperating with an opening between the two ports to provide an adjustable bypass, means for manually adjusting the valve, a graduated dial rotatable with said means, and a tab cut and bent from said dial in a manner providing an opening through which to adjust the screw and also providing a stop for engaging the screw and thereby limiting rotation of the dial in one direction.

6. In combination with an oven and a wall thereof, an oven regulator comprising a body member having two connected gas ports extending thereinto, said member being located within the oven adjacent to the inner face of said wall, a valve intercepting said ports, a thermostatic member in the oven spaced from and connected to the valve for regulating the valve automatically in accordance with the heat of the oven, a bushing carried by the body member and extending outwardly through the wall, a plate carried by the body member and bushing and having an annular rib engaging the wall about the bushing, means outside the oven extending inwardly through the bushing and connected to the valve for adjusting the valve manually, and a dial carried by said means and engaging the outer face of the wall opposite to said annular rib.

ANTON M. VEDOE.